Sept. 1, 1964  M. MENDELSOHN ETAL  3,147,150
BATTERY ELECTRODE SEPARATOR
Filed Dec. 16, 1957
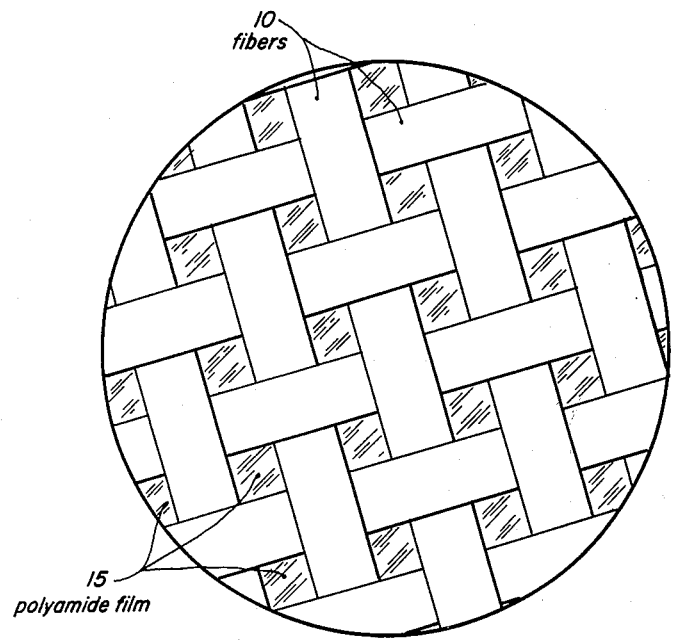
INVENTORS:
MEYER MENDELSOHN
CARL HOROWITZ
BY
AGENT

3,147,150
BATTERY ELECTRODE SEPARATOR

Meyer Mendelsohn, New York, and Carl Horowitz, Brooklyn, N.Y., assignors, by mesne assignments, to Yardney International Corp., New York, N.Y., a corporation of New York
Filed Dec. 16, 1957, Ser. No. 702,904
1 Claim. (Cl. 136—143)

This invention relates to an interelectrode separator for electric batteries.

Films of synthetic resinous materials such as nylon, Orlon, Dynel, Acrilan etc. have many desirable physical properties such as high tensile strength and high wet strength. In addition they possess inherent resistance to attack by chemical solutions at normal and extreme temperatures. It is, therefore, desirable to use such materials in environments where these physical and chemical properties are of value. This includes their use as battery separators and anode bags; for such use, however, these materials possess the shortcoming of high electrolytic resistance.

The general object of this invention is to provide a novel sheet material made from synthetic resin and suitable for use in battery separators and anode bags.

The separator according to our invention is produced by the deposition of a film-forming treatment agent, specifically nylon, on a fabric of fibrous synthetic-resin material. The deposition is achieved by precipitation of the film-forming treatment agent in an aqueous medium after it has been applied to the fibrous material from an organic solution of an alcohol-soluble polyamide.

The above process involves the coating of a woven or felted fibrous material, of the character referred to with a solution of low-molecular-weight nylon in a polar solvent for the nylon, the solvent also being water-miscible. After this solution has been applied to the fibers, the polar solvent is replaced with water by a leaching process. By this process it becomes possible to produce polyamide films with equivalent resistances of the order of 0.1 ohm/cm.$^2$ as a coating on a resinous fabric, as compared with about 10–15 ohms/cm.$^2$ for conventional polyamide films of like thickness.

Previous attempts at coating fabrics with hitherto known treatment agents have resulted in non-uniform products which were prone to cracking and tended to exhibit other forms of discontinuity as evidenced by their high permeability to air and gases. Since permeability of this sort indicates the presence of interstitial openings through the fabric, it is evident that solid particles can also penetrate through such openings. This is especially bad when such fabrics are used as either battery separators or anode bags. In the first case it permits metal-particle penetration through the separator and the formation of what is known in the industry as "trees" consisting of chains of metal particles stretching from the negative to the positive electrodes with consequent formation of short-circuit pathways which soon deplete the electrochemical energy stored in the electrodes. In the latter case, inasmuch as anode bags are used primarily in certain delicate electrolytic plating processes where contamination of the solution by non-ionized anode material will seriously interfere with the purity of the metals deposited on the cathode, the presence of such interstitial openings will facilitate undesirable migration of contaminants which, in such applications as "bright" metal plating and the controlled-voltage separation of rare ores, can seriously interfere with the very purpose of the process.

It has been found that when battery separators according to this invention are subjected to a concentrated (e.g. 44%) alkaline electrolyte solution over prolonged periods of time and to a large number of charge/discharge cycles they continue to function whereas conventional materials deteriorate and cause shorts in the batteries. Moreover, the extremely low internal resistance of cells or batteries equipped with the separator material of this invention permits much higher discharge rates as well as greater efficiency when compared to cells containing earlier types of separators.

In addition, cells made with the materials of this invention serving as interelectrode separators, when subjected to repeated charge/discharge cycles under extreme conditions of overcharge known to promote degradation of separator materials, have been found to have a much lower degradation rate than those containing the materials of the prior art.

Example 1

A solution is prepared as follows:

8 grams of short-chain nylon, commercially available under the trademark of Zytel 61, is heated on a water or steam bath in 92 grams of dimethyl formamide until dissolved. Into the resulting solution is dipped a woven nylon fabric having a thickness of, for example, about 0.1 mm. The excess of the solution is removed from the fabric with a rod or a blade. The impregnated fabric is then dipped into a large container of water and the di-methyl formamide is displaced by the water. The fabric is then dried and is ready for use. The electrical resistance of the coated fabric is 0.08 ohm/cm.$^2$.

Example 2

The same materials are used but, instead of di-methyl formamide, di-methyl sulfoxide is used as the initial solvent for the short-chain polyamide resin (Zytel 61). The fabric has a resistance of the same order as that of the fabric in Example 1 and is impervious to gases.

Example 3

Proceed as in Example 1, but for the polyamide resin a mixture of isopropyl alcohol and di-methyl sulfoxide 50–50 is used as the solvent, with similar results.

In general, any suitable solvent may be used provided that it be capable of polar displacement with water.

Among the suitable solvents for such polar displacement are ethylene carbonate, methyl alcohol, ethyl alcohol, propylene carbonate butyrolactone, isopropyl alcohol and N-methyl-2-pyrrolidone.

In general the polyamide resin should be any of the short-chain, alcohol- (or polar-solvent-) soluble polyamides including such nylon copolymers as polymeric sebacamide, epsilon caprolactam and adipamide. Impregnating solutions prepared as disclosed above can be applied to fibers other than nylon, such as Dynel, saran, Orlon, etc. The fabric of course must not be soluble in polar solvents or in water.

Example 4

An ion exchanger may be deposited upon a fabric carrier to form an ion-exchange film by means of this general method in the following manner:

A solution of a short-chain polyamide resin is prepared by dissolving sufficient of the short-chain resin in butyrolactone to achieve a 15% solution. To this is added finely ground sodium polystyrene sulfonate resin, such as the one commercially available under the designation of Permutit Q. A fine nylon fabric is dipped into the resulting agitated slurry for 15 seconds until completely impregnated. The fabric is then removed from the slurry and the excess slurry is removed by pressing between rubber rollers. The fabric is then dipped into a water tank to achieve the solvent displacement. A five-minute soak or a two-minute wash in running water is sufficient to remove the solvent. The material is then soaked in a 15% solution of diethylene glycol for 15 minutes and dried. This final treatment is to impart plasticity and hygroscopic properties to the ion-exchange membrane, causing it to be wetted more quickly by any solution with which the ion-exchange membrane is thereafter brought into contact, such as an electrolyte.

Membranes have been prepared by variations of the above method containing 20% to 70%, by weight, of ion-exchange resin.

Resins other than the nylon copolymers mentioned above, capable of solvent-displacement deposition, include polyvinyl butyral as well as copolymers of acrylonitrile and vinylidene chloride known as Dynel.

The various impregnated sheets formed by this method may be used for a variety of functions including battery separators for alkaline or acid batteries. Particularly in the case of silver-zinc batteries, batteries incorporating the separators of Examples 1–4 may be cycled continuously through a charge/discharge function for at least twice the number of cycles which conventional cellulosic separators afford. Additionally, it has been noted that batteries employing conventional separators, after a certain minimal period, show an ever-increasing loss of capacity. When separators prepared from the materials of this invention with ion exchangers are used, this minimal capacity-loss-free number of cycles is increased threefold.

The sole figure of the accompanying drawing shows an enlarged portion of a membrane according to the invention.

As shown in the drawing, a film 15 is deposited on and between the fibers of a fibrous sheet 10. The film 15 is precipitated in place by leaching a polar solvent from a solution of short-chain polyamides with which said sheet material is impregnated (and which may contain an ion-exchange resin) by means of a non-solvent liquid miscible with such solvent, as described in the foregoing examples.

The impregnation of the sheet 10 can, of course, be carried out by any known means such as dipping or spraying. The degree of impregnation can be controlled by pretreatment of the fibrous material with chemical surface-tension-altering agents or by vacuum-treating the dipped materials to dislodge entrained gases and to assure the formation of a continuous film.

It is of course understood that, where necessary, the fibrous sheet material may be formed into cylindrical or other shapes either before or after the treatment set forth.

The precipitated polyamide films of the present invention, whether or not incorporating an ion-exchanger (whose presence is particularly desirable when the material is used as an inter-electrode separator for high-rate-discharge electrochemical batteries), has been found to have an electrolytic resistance materially below that of polyamide films of comparable thickness obtained by mere solvent evaporation.

We claim:

In an electric battery, the combination of a set of electrodes with an interelectrode separator consisting essentially of a sheet constituted by a fabric of synthetic resinous fibers having a nylon film deposited thereon, said film having been obtained from an organic solution of an alcohol-soluble polyamide by precipitation in an aqueous medium, said separator having an equivalent electrical resistance below substantially 1 ohm/cm.$^2$ and being impermeable to gases but semipermeable to ionic solutions.

References Cited in the file of this patent

UNITED STATES PATENTS

| | | |
|---|---|---|
| Re. 24,222 | Patnode et al. | Sept. 18, 1956 |
| 1,358,858 | Krejci | Nov. 16, 1920 |
| 2,510,262 | Sollner | June 6, 1950 |
| 2,544,637 | Caldwell | Mar. 13, 1951 |
| 2,591,755 | Wilson | Apr. 8, 1952 |
| 2,681,320 | Bodamer | June 15, 1954 |
| 2,714,097 | Watson et al. | July 26, 1955 |
| 2,728,737 | Witcoff | Dec. 27, 1955 |
| 2,774,108 | Wyllie | Dec. 18, 1956 |
| 2,882,186 | Schonberg et al. | Apr. 14, 1959 |

FOREIGN PATENTS

| | | |
|---|---|---|
| 958,891 | France | Sept. 21, 1949 |
| 1,000,350 | Germany | Jan. 10, 1957 |